Figure 1:
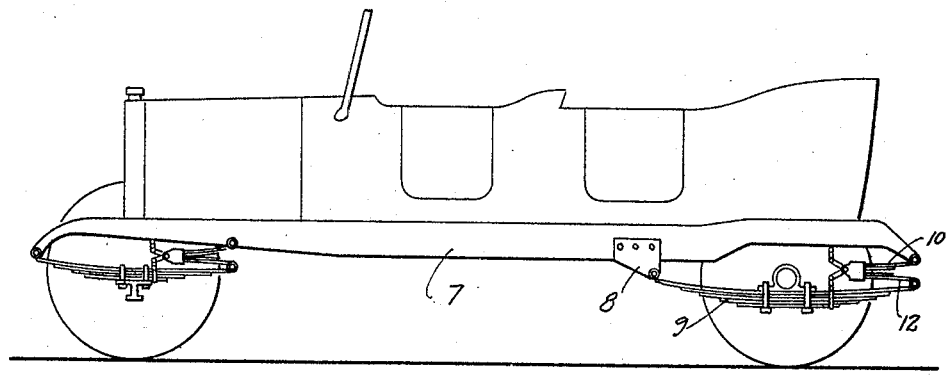

Feb. 23, 1926.  1,574,730
W. L. FOSTER
SHOCK ABSORBER
Filed Nov. 15, 1923  2 Sheets-Sheet 1

INVENTOR.
Walter L. Foster
BY Nestall and Wallace
ATTORNEYS

Feb. 23, 1926.

W. L. FOSTER 1,574,730

SHOCK ABSORBER

Filed Nov. 15, 1923   2 Sheets-Sheet 2

INVENTOR.
Walter L. Foster
BY Westall and Wallac
ATTORNEYS

Patented Feb. 23, 1926.

1,574,730

UNITED STATES PATENT OFFICE.

WALTER L. FOSTER, OF WHITTIER, CALIFORNIA.

SHOCK ABSORBER.

Application filed November 15, 1923. Serial No. 674,877.

*To all whom it may concern:*

Be it known that I, WALTER L. FOSTER, a citizen of the United States, and resident of Whittier, in the county of Los Angeles, in the State of California, have invented new and useful Improvements in Shock Absorbers, of which the following is a specification.

This invention relates to a spring support for vehicles, and pertains particularly to an auxiliary spring structure for increasing the resiliency and for acting as a shock absorber.

The primary object of this invention is to provide a device of the character above specified which may be applied to a vehicle between the springs and the frame without requiring any mutilation or alteration of the parts as commonly constructed. Another object of this invention is to provide a device of the class described which will have the effect of lengthening the spring supports and will provide a multiplicity of places for the absorbtion of minor shocks.

Figure 2:
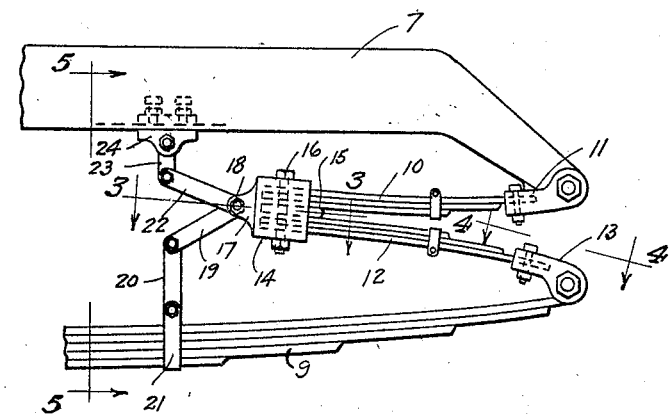
Figure 3:
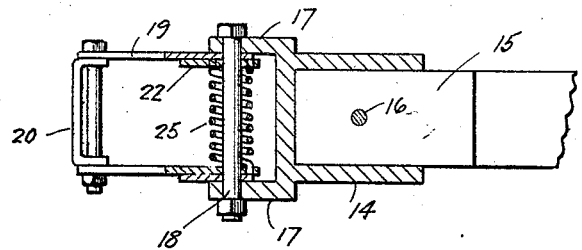
Figure 4:
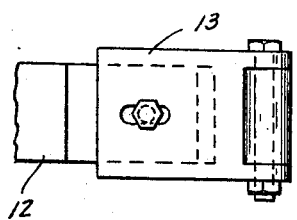
Figure 5:
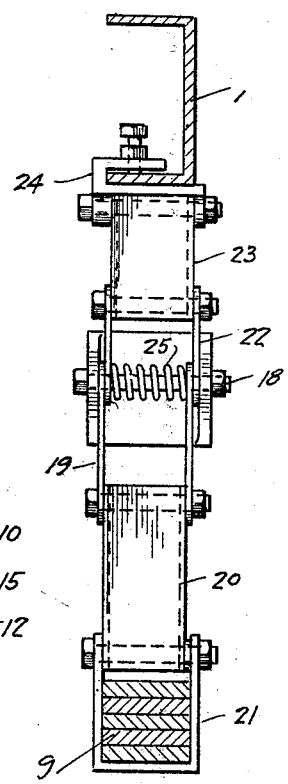
Figure 6:
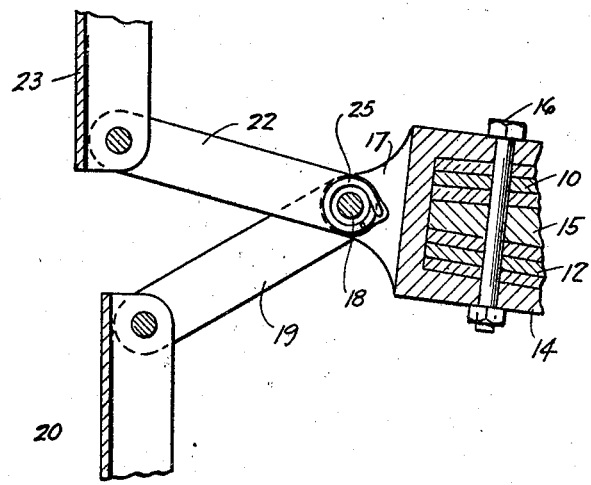

These objects together with other objects will be obvious from the appended description, reference being had to the drawing, in which:

Fig. 1 is a side elevation of an automobile, a vertical section being taken through the running gear to better illustrate the invention and show my improved shock absorber which is applied thereto; Fig. 2 is an enlarged fragmentary view of the rear spring with my improved device applied thereto; Fig. 3 is a fragmentary view as seen on the line 3—3 of Fig. 2; Fig. 4 is a section taken on the line 4—4 of Fig. 2; Fig. 5 is a section as seen on the line 5—5 of Fig. 2; and Fig. 6 is an enlarged fragmentary view of a portion of the structure shown in Fig. 2, a section through the spring box and recoil mechanism being shown.

Referring more particularly to the drawing, 7 indicates a side bar of an automobile frame. The vehicle illustrated herein is equipped with semi-elliptic springs at the front and rear. Each spring is equipped with my improved shock absorber and it will only be necessary to describe one of the shock absorbers as applied to a spring in order to fully disclose the inventive idea.

The side bar 7 ends in a horn, to which the end of the spring is ordinarily connected by means of a shackle. The front end of the spring is connected by a shackle bolt and hanger 8 to the frame. The shackle at the rear is removed and the ends of a cantilever spring formed of leaves indicated by 10 is attached thereto by the shackle bolt. For convenience of construction a fitting 11 may be secured to the end of the spring 10 and is provided with an eye so that it may be attached to the frame by means of a shackle bolt. Opposite to spring 10 is a similar spring 12, which is attached to the main spring 9 by means of an attachment 13 and a shackle bolt whose position is adjustable, see Fig. 4. The ends of the springs 10 and 12 are mounted in a box 14, a wedge 15 being interposed between the springs so as to cause them to diverge. A bolt 16 holds the springs and wedge in position in the box. The box 14 is provided with ears 17 spanned by a pivot bolt 18.

Mounted upon the pivot bolt 18 is a frame 19 having side arms whereby it is connected to a link 20 and thereby to a clip 21 which is secured about the spring 9. A similar frame 22 is connected by a link 23 to a bracket 24 mounted upon the beam 7. Embracing the pivot bolt 18 is a torsion spring 25 having one end secured to the frame 19 and the other end secured to frame 22. The arrangement is such as to tend to close the frames 19 and 22. Their connection to the beam 7 and the spring 9 is such as to tend to hold the box 14 midway between the beam and main spring. It also impedes recoil of the spring and frame.

It is obvious that there are three places to take up the minor shocks, namely, the end of the main spring adjacent to fitting 13, the end of the auxiliary spring 12 adjacent to fitting 13, and the end of the spring 10 adjacent to fitting 11.

What I claim is:

1. In combination with a leaf spring and frame supported thereon, a shock absorber interposed therebetween comprising a pair of reentrant cantilever springs, fittings securing the ends of said cantilever springs to said frame and said leaf spring and a recoil structure tying the juncture of said cantilever springs to said leaf spring.

2. In combination with a leaf spring and frame supported thereon, a shock absorber interposed therebetween comprising a pair of reentrant cantilever springs, fittings securing the ends of said cantilever springs to said frame and said leaf spring and being longitudinally adjustable, and a recoil structure secured to the juncture of said cantilever springs and an intermediate portion of said leaf spring.

In witness that I claim the foregoing I have hereunto subscribed my name this 31st day of October, 1923.

WALTER L. FOSTER.